United States Patent Office 3,840,498
Patented Oct. 8, 1974

3,840,498
FILM FORMING POLYAMIDE COMPOSITION FROM FUMARIC ACID AND AROMATIC CARBOCYCLIC DIISOCYANATE
James R. Stephens, Naperville, Ill., assignor to Standard Oil Company, Chicago, Ill.
No Drawing. Filed Mar. 13, 1972, Ser. No. 234,316
Int. Cl. C08g 20/20
U.S. Cl. 260—78 UA     3 Claims

ABSTRACT OF THE DISCLOSURE

This invention relates to the production of novel insulating and protective coatings for electric wire and other surfaces. More particularly it relates to the preparation of coating solutions wherein fumaric acid and diisocyanates are reacted, at a temperature of from 50° C. to 240° C., in a polar solvent. The polymers and coating solutions are useful as electrical coatings and molding compositions.

This invention relates to high-molecular-weight polymers derived from fumaric acid and organic diisocyanates. These polymers are useful as wire enamel in the protection of electrically conductive metallic wire such as copper. Other wire enamel polymers such as polyimides from pyromellitic dianhydride are known. However, new and different polymers are desirable in view of the cost of the polyimides and the different properties obtainable with a polymer of a different composition.

The new polymers are also useful for the preparation of a variety of heat-resistant, insulating films, fibers, coatings and molded articles.

It has been discovered that polyamide polymers result from the reaction of fumaric acid and a diisocyanate, and exhibits surprisingly good film and molding properties.

The polymers of this invention may be described as polyamides, produced advantageously by the reaction of fumaric acid and a diisocyanate. Such polyamides are polymers which may be represented by the following formula $$\left[ -R-N-\overset{H}{\underset{|}{C}}-\overset{O}{\underset{|}{C}}=\overset{H}{\underset{|}{C}}-\overset{O}{\underset{|}{C}}-\overset{H}{\underset{|}{N}}- \right]_n$$

wherein $n$ is an integer having a value of at least 5 but usually exceeding 50 and where R is an aliphatic or aromatic organic radical, preferably an aromatic radical. R advantageously is a divalent aromatic organic radical consists of R′ which is a divalent, aromatic, hydrocarbon radical such as meta-phenylene or two R′ divalent aromatic hydrocarbon radicals joined by stable linkages of

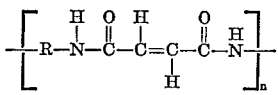

as are in the groups

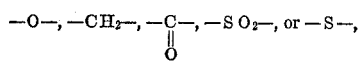

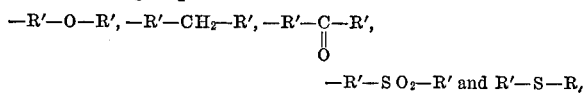

The molecular weights of these polyamides are sufficiently high to produce films.

These polymers are particularly useful in electrical insulation. The use of synthetic resins in electrical insulation is not new. In fact, many have found wide commercial acceptance in such applications as, for instance, magnet-wire coating. In that process, wire of an appropriate gauge is first successively covered by means of a specialized technique with multiple layers of one or more enamels. The covered wire is then wound into coils for incorporation into motors, generators and the like. Prior to final assembly however, the stator and rotor coils are dipped into special varnishes which when baked will form a firmly binding envelope and will, in addition, often contribute to the total insulation of the system.

It has been found that excellent coating compositions can be prepared by reacting diisocyanate and fumaric acid in a polar solvent at temperatures of about 50° C. to about 240° C. The resulting coating solution of the partial condensation product of fumaric acid and the diisocyanate is stable and cures to a tough, chemical- and heat-resistant coating at curing temperatures of about 200° C. to 420° C. The cure can be hastened by the addition of trace amounts of peroxides such as benzoyl peroxide. In another aspect, the invention is directed to a process for producing thermally stable films, laminates and molding compositions.

The following are examples of useful diisocyanates: Aliphatic diisocyanates such as butane-, hexane-, or heptane-diisocyanate; cycloalky or alkycycloalkyl diisocyanates such as the 1,3- and 1,4-diisocyanates of cyclohexane, 1-methyl-cyclohexane-2,4-diisocyanate, 1,4-diisocyanatomethylcyclohexane, bis (4 - isocyanatocyclohexyl) methane, and sym (4-isocyanatocyclohexyl) ethane; diisocyanates of benzene and its homologs such as the 1,3- and 1,4-di-isocyanates of benzene, 4-isocyanatomethyl benzeneisocyanate, the 1,3- and 1,4-diisocyanatomethylbenzenes, the 2,4- and 2,6-toluene diisocyanates and mixtures of their isomers, and mono-, di- and tri-isopropylbenzene diisocyanates; aromatic diisocyanates such as 4,4′-diphenyldiisocyanates; bis(4 - isocyanatophenyl) methane and bis (2-isocyanate-4-methylphenyl) methane; polynuclear diisocyanates such as the 1,4- and 1,5- diisocyanates of naphthalene or tetrahydronaphthalene and 2,6-diisocyanatoanthraquinone. Others include the polyisocyanates of naphthalene, diphenyl, di- and tri-phenylmethane and other polyphenyl or polynuclear compounds. The polyisocyanates used according to the invention may also be substituted by alkyl, cycloalkyl, alkylcycloalkyl, phenyl and homologs, diphenylalkyl, diphenylsulfide, naphthyl and hydronaphthyl, and polynuclear. Examples of these are 1-chlorobenzene-, 1-nitrobenzene- and 1-methoxybenzene- 2,4-diisocyanate. Polyarylpolyisocyanates are preferred. Advantageously, the isocyanato groups are in the meta or para positions in the aromatic nucleus and particularly on separate rings when the nucleus has more than one aromatic ring. The preferred diisocyanates are bis (4-isocyanatophenyl) methane, 4-isocyanatophenyl ether, p-diisocyanato benzene, m-diisocyanatobenzene, bis(3-isocyanatophenyl) methane, 3-isocyanatophenyl ether, the naphthalene diisocyanates 3,3′-diisocyanato diphenyl ketone and 4,4′-diisocyanato diphenyl ketone.

To prepare the novel wire-enamel coating solution, the fumaric acid is reacted with the diisocyanate at a temperature of about 50° C. to 240° C., preferably at a temperature of 100 to 200° C. in an organic polar solvent. Representative solvents are N,N-dimethylacetamide, N-methylpyrrolidone, N,N - dimethylformamide, m-cresol and the like. N,N-dimethylacetamide and N-methylpyrrolidone are preferred. The fumaric acid and diisocyanate are present in a molar ratio of 1:1 to 1:1.5, the preferred ratio being 1.0:1.0 to 1.0:1.2.

In the suitable process fumaric acid is mixed with about 1.0 to about 1.5 moles, preferably 1.0 to 1.2 moles of a diisocyanate in a suitable solvent such as N-methylpyrrolidone, dimethylacetamide and the like. The reaction mixture is heated until evolution of carbon dioxide ceases. The heating is carried out at about 50° C. to 220° C., preferably at 125° C. to 200° C. The reaction time is about 1 to 5 hours.

The polyamides have a minimum inherent viscosity, when dissolved in a solvent such as N,N-dimethylacetamide, of about 0.4 (as defined on page 34 ff. of *Preparative Methods of Polymer Chemistry* (1961) by W. R. Sorenson and T. W. Campbell). The relative viscosity of polymer solutions containing less than one percent polymer is measured at 25° C. in a thermo-statted bath. The formula on page 35 of the Sorenson and Campbell textbook is used to calculate the inherent viscosity. The minimum inherent viscosity varies somewhat with the particular diisocyanate employed in the reaction. This may be illustrated by the minimum inherent viscosity of about 0.4 for the polyamide prepared with bis (4-isocyanatophenyl) methane.

It is unexpected that useful products were produced from fumaric acid and diisocyanates since when trimellitic anhydride or 1,1,3-trimethyl-5-carboxy-3-(p-carboxy phenyl) indane were substituted in the reaction for fumaric acid the films were brittle indicating low molecular weight and were attacked by the solvent N-methylpyrrolidone.

In some instances, it is desired to modify the properties of the coating solution by using suitable reactants with different functionalities. To illustrate, polyisocyanates with more than two isocyanato groups such as triisocyanates can be used to form polymers with varying degrees of solubility and varying amounts of cross-linking. Blocking of some isocyanato groups with phenols and the like can be utilized to limit the cross-linking in the final, cured products.

The following example illustrates the preparation and utilization of a particular embodiment of this invention. It will be understood that this embodiment is for illustrative purposes and does not purport to be wholly definitive with respect to conditions or scope.

EXAMPLE I 110 g. of N-methylpyrrolidone, 11.61 g. of fumaric acid, 3 drops of pyridine, and 25.03 g. of bis (4-isocyanatophenyl) methane were mixed and heated at a temperature of 125° C. for 4 hours. The product was a non-gelling formulation with a viscosity of 23 poises; this product was stable for at least 10 days.

The product was spread as a film and baked at 600° F. for 5 minutes on glass to yield clear, tough, flexible, creasable films that were resistant to attack by N-methylpyrrolidone solvent at room temperature. By comparison, when trimellitic anhydride or 1,1,3-trimethyl-5-carboxy-3-(p-carboxy phenyl) indane was substituted for fumaric acid in the preparation of polyamides under the same reaction conditions and films were prepared from these products, they were found, under the same test conditions, to be brittle and were attacked by N-methylpyrrolidone.

EXAMPLE II

A mixture of 41.7 g. of fumraic acid and 250 ml. of N-methylpyrrolidone (NMP) was heated with stirring to 100° C.; then 90.0 g. of bis(4-isocyanatophenyl) methane was added over a 15 minute period. An additional 40 ml. of NMP was added and the temperature brought up to 180° C. in 15 minutes. The reaction solution was held at 180–190° C. for one hour, then cooled. The solution of 22 poises in viscosity was precipitated in a home blender with 1 liter of distilled water, filtered and dried to yield 98 g. of the polymer.

The product had an inherent viscosity ($\eta$ 0.5) at 0.5% concentration in NMP of 0.42 at 25° C. It could be molded at 420° F. and 8,000 p.s.i. to yield a clear hard plastic. The product dissolved in NMP at 20% solids was cast with a doctor blade on glass plates and cured at 300° F. for 30 minutes then at 600° F. for 3 minutes, then stripped off to yield a 1.3 mil thick free film that registered 300 double folds on the MIT film endurance tester.

I claim:

1. A film forming polyamide consisting essentially of the polymeric condensation product prepared by reacting an aromatic carbocyclic diisocyanate and fumaric acid in an inert polar solvent boiling above 100° C. at a temperature of about 50–240° C. while maintaining a molar ratio of the diisocyanate to fumaric acid of 1:1 to 1.5:1.
2. The polyamide of Claim 1 wherein the diisocyanate is bis-(4-isocyanatophenyl) methane.
3. A film of the polyamide of Claim 1.

References Cited

UNITED STATES PATENTS

| | | | |
|---|---|---|---|
| 2,174,619 | 10/1939 | Carothers | 260—78 UA |
| 2,268,586 | 1/1942 | Gilman | 260—78 UA |
| 3,647,765 | 3/1972 | Montillaro et al. | 260—78 UA |

OTHER REFERENCES

Chemical Abstracts, Vol. 59 (1963), pp. 770g–771a.

HAROLD D. ANDERSON, Primary Examiner

U.S. Cl. X.R.

117—231; 174—110 N; 260—30.2, 32.6 N, 33.4 R, 47 CB